United States Patent
Ozaki

(10) Patent No.: US 8,390,881 B2
(45) Date of Patent: Mar. 5, 2013

(54) PRINT CONTROL DEVICE, PRINT CONTROL METHOD, AND COMPUTER-READABLE STORAGE MEDIUM

(75) Inventor: Hiroshi Ozaki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 867 days.

(21) Appl. No.: 12/480,385

(22) Filed: Jun. 8, 2009

(65) Prior Publication Data

US 2009/0303509 A1 Dec. 10, 2009

(30) Foreign Application Priority Data

Jun. 10, 2008 (JP) ................................. 2008-151822

(51) Int. Cl.
*H04N 1/60* (2006.01)

(52) U.S. Cl. ...... 358/1.9; 358/1.13; 358/1.14; 358/1.15; 358/1.17; 382/226; 399/368; 399/369; 271/182; 271/270

(58) Field of Classification Search ............... 358/1.9, 358/1.13, 1.14, 1.15, 1.17, 406, 504; 382/226; 399/368, 369; 271/182, 270
See application file for complete search history.

(56) References Cited

U.S. PATENT DOCUMENTS

| | | | |
|---|---|---|---|
| 7,567,360 B2* | 7/2009 | Takahashi et al. ........... 358/1.15 |
| 7,821,662 B2 | 10/2010 | Matsueda et al. | |
| 8,228,525 B2* | 7/2012 | Zaremski et al. ............. 358/1.14 |
| 2006/0210289 A1* | 9/2006 | Yamauchi et al. ............... 399/38 |
| 2006/0244936 A1* | 11/2006 | Ozawa ............................ 355/40 |
| 2006/0262342 A1* | 11/2006 | Kumagai et al. ............. 358/1.14 |
| 2007/0201071 A1* | 8/2007 | Yamada et al. ............... 358/1.13 |
| 2007/0277693 A1* | 12/2007 | Drexler ......................... 101/485 |

FOREIGN PATENT DOCUMENTS

| | | |
|---|---|---|
| CN | 1983155 A | 6/2007 |
| EP | 778136 A2 | 6/1997 |
| EP | 778136 A3 | 12/1997 |
| JP | H7-178975 A | 7/1995 |
| JP | H9-156137 A | 6/1997 |
| JP | 2003-029956 A | 1/2003 |
| JP | 2007193808 A | 8/2007 |

\* cited by examiner

*Primary Examiner* — King Poon
*Assistant Examiner* — Allen H Nguyen
(74) *Attorney, Agent, or Firm* — Canon U.S.A., Inc. IP Division

(57) ABSTRACT

A print control method allowing a printing apparatus to perform printing based on a plurality of contents used for outputting a plurality of components to be finally integrated is provided. The CPU determines whether component basis post-processing is set in each of the plurality of contents. The printing sequence is determined such that a first content determined as a content in which the component basis post-processing is set is printed in advance of a second content determined as a content in which the component basis post-processing is not set.

13 Claims, 13 Drawing Sheets

FIG. 12A

| COMPONENT NO. | REPRESENTATIVE CLASSIFICATION | POST-PROCESSING | DETERMINED PROCESS SEQUENCE | DETERMINED PRINTING SEQUENCE | NO. OF PAGES |
|---|---|---|---|---|---|
| 1 | COVER | — | — | — | — |
| 2 | MAIN BODY | — | — | — | — |
| 3 | FOLDOUT | Z FOLDING | — | — | — |

FIG. 12B

| COMPONENT NO. | REPRESENTATIVE CLASSIFICATION | POST-PROCESSING | DETERMINED PROCESS SEQUENCE | DETERMINED PRINTING SEQUENCE | NO. OF PAGES |
|---|---|---|---|---|---|
| 1 | COVER | — | 3 | 2 | 1 |
| 2 | MAIN BODY | — | 3 | 3 | 350 |
| 3 | FOLDOUT | Z FOLDING | 2 | 1 | — |

FIG. 13

BOOKBINDING PROCEDURE   JOB-ID: 00011 BOOKBINDING JOB1

PRINTING PROCESS

| MAJOR CLASSIFICATION | NAME | NEXT PROCESS | NEXT SUBSEQUENT PROCESS |
|---|---|---|---|
| FOLDOUT: | FOLDOUT 1 | PROCESS 2 | PROCESS 3 |
| COVER: | COVER 1 | PROCESS 3 | PROCESS 4 |
| MAIN BODY: | MAIN BODY 1 | PROCESS 3 | PROCESS 4 |

PROCESS 2 (FOLDING)   Z FOLDING

| MAJOR CLASSIFICATION | NAME | NEXT PROCESS | NEXT SUBSEQUENT PROCESS |
|---|---|---|---|
| FOLDOUT: | FOLDOUT 1 | PROCESS 3 | PROCESS 4 |

PROCESS 3 (BINDING)   CASE BINDING

| MAJOR CLASSIFICATION | NAME | NEXT PROCESS | NEXT SUBSEQUENT PROCESS |
|---|---|---|---|
| COVER: | COVER 1 | PROCESS 4 | — |
| MAIN BODY: | MAIN BODY 1 | PROCESS 4 | — |
| FOLDOUT: | FOLDOUT 1 | PROCESS 4 | — |

PROCESS 4 (TRIMMING)   TRIMMING {A4 A4 ANGLE: 0.0 0.0 0.0 POSITION: 0.0}

| MAJOR CLASSIFICATION | NAME | NEXT PROCESS | NEXT SUBSEQUENT PROCESS |
|---|---|---|---|
| COVER: | COVER 1 | — | — |
| MAIN BODY: | MAIN BODY 1 | — | — |
| FOLDOUT: | FOLDOUT 1 | — | — |

PRINT CONTROL DEVICE, PRINT CONTROL METHOD, AND COMPUTER-READABLE STORAGE MEDIUM

BACKGROUND OF THE INVENTION

1. Field of the Invention

The present invention relates to a print control device for controlling a printing apparatus that receives a print job and processes the print job, a print control method, and a computer-readable storage medium.

2. Description of the Related Art

In traditional bookbinding, in a printing process, a printing apparatus prints contents contained in a print job in the sequence of composition of the contents and outputs components for use in a post-processing process or a binding process. In the post-processing process, post-processing apparatuses perform post-processing on the output components on a component basis. In the binding process, all the components are finally integrated by a binding apparatus. In such a case, typically, a process begins after the completion of its previous process.

For example, in bookbinding a print job that contains contents consisting of a cover, a main body, and a foldout in this order in composition, first, a printing apparatus prints all of these contents in the sequence of composition of the contents (in the order of the cover, the main body, and the foldout) in a printing process. After the completion of the printing process, a folding apparatus folds the foldout output in the printing process in a post-processing process. After the completion of the post-processing process, a binding apparatus binds all of the components (the cover, the main body, and folded foldout) in a binding process. Here, post-processing on a component basis (hereinafter referred to sometime as component basis post-processing) indicates post-processing performed on a part of components, unlike binding post-processing performed on all components. For example, in the above-described example case, folding performed on only the foldout is one example of the component basis post-processing, whereas binding performed on all of the components is not an example of the component basis post-processing.

However, with the above-described technique, the folding apparatus cannot fold a foldout unless printing of the foldout performed at the last is completed. Only after the completion of folding on the foldout, a binding process begins. When contents contained in a print job are printed in the sequence of composition of the contents, as in the above-described way, the time necessary to complete the entire bookbinding is long, and time efficiency is low. Japanese Patent Laid-Open Nos. 7-178975 and 9-156137 disclose a method enabling improvement of time efficiency in printing by execution of printing on a job basis or a page basis to perform parallel printing of a plurality of print jobs.

However, the techniques described in the above-mentioned patent documents enhance efficiency in printing on a plurality of jobs. Accordingly, a problem remains of the impossibility of reducing the time required for completing a task of a single print job in which components output on the basis of a plurality of contents contained in the print job are subjected to post-processing and are finally integrated.

SUMMARY OF THE INVENTION

The present invention provides a mechanism capable of reducing the time required for completing a task of a single print job in which components output on the basis of a plurality of contents contained in the print job are subjected to post-processing and are finally integrated.

According to an aspect of the present invention, a print control device for causing a printing apparatus to perform printing based on a plurality of contents used for outputting a plurality of components to be finally integrated is provided. The print control device includes a determining unit and a sequencing unit. The determining unit is configured to determine whether component basis post-processing is set in each of the plurality of contents. The sequencing unit is configured to determine a printing sequence of printing the plurality of contents. The sequencing unit determines the printing sequence such that at least one first content determined by the determining unit as a content in which the component basis post-processing is set is printed in advance of at least one second content determined by the determining unit as a content in which the component basis post-processing is not set.

With the present invention, a printing sequence in a printing process is determined in consideration of a subsequent post-processing process, thus allowing the next post-processing to be performed in parallel with the printing. Thus, the time required for completing a task of a job can be reduced, and time efficiency can be improved.

Further features of the present invention will become apparent from the following description of exemplary embodiments (with reference to the attached drawings).

BRIEF DESCRIPTION OF THE DRAWINGS

FIGS. 12A and 12B illustrate an example of a process chart.

FIG. 13 illustrates an example of a bookbinding procedure.

DESCRIPTION OF THE EMBODIMENTS

Embodiments of the present invention are described below with reference to the accompanying drawings.

Figure 1:
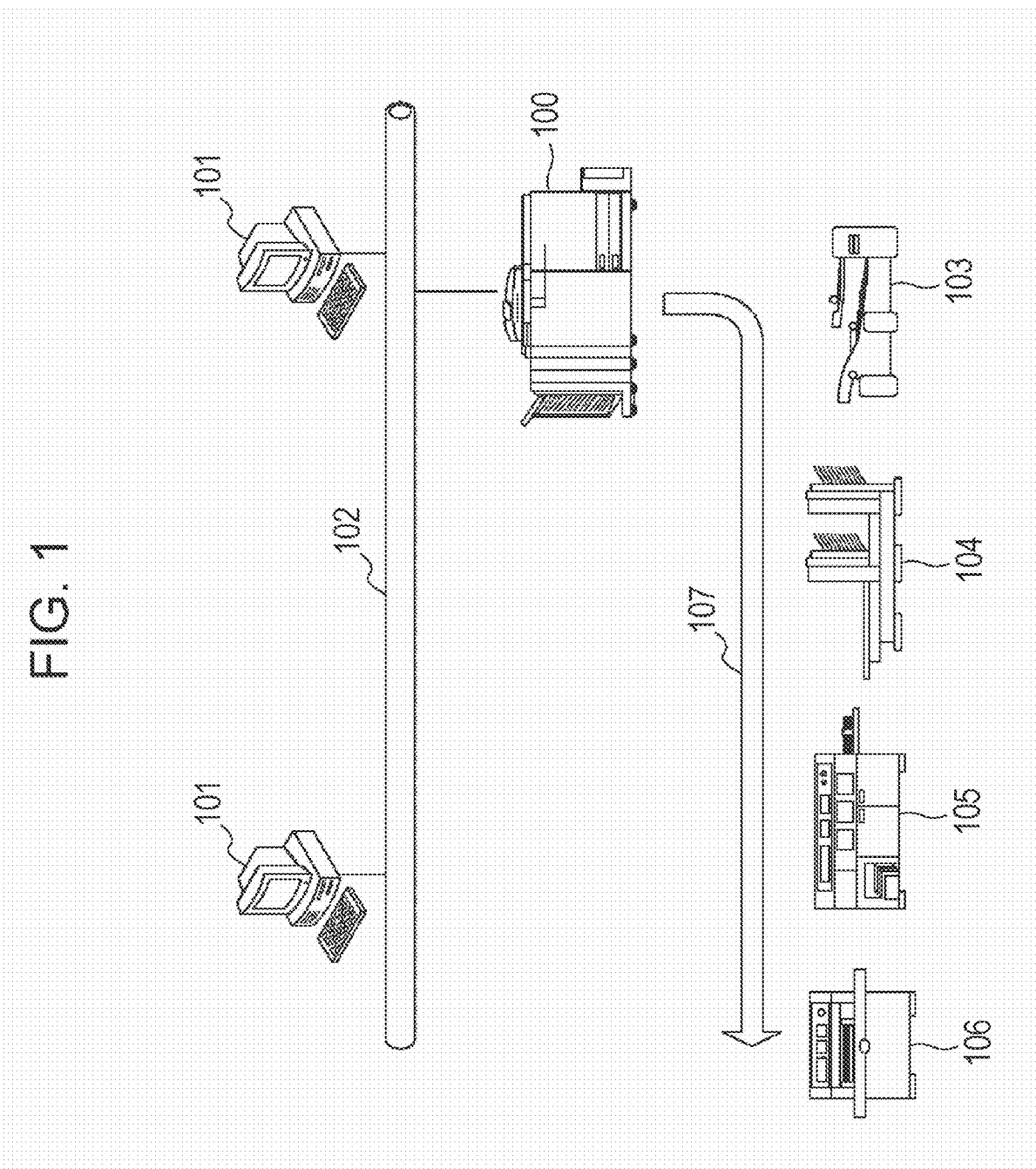
FIG. 1 illustrates a configuration of a bookbinding system.

First, a system used in an embodiment is described in general. FIG. 1 illustrates an example configuration of the system in the present invention. As illustrated in this drawing, client personal computers (PCs) 101 and a printing apparatus 100 are connected to one another over a network 102. The printing apparatus 100 can receive a print job that contains one or more contents from at least one of the client PCs 101 and can print the print job. The plurality of client PCs 101 connectable over the network 102 bear the same reference numeral in the specification.

A post-processing apparatus performs post-processing on a component output by the printing apparatus 100. Examples of the post-processing apparatus can include various apparatuses, such as a folding apparatus 103, a saddle stitching apparatus 104, a case binding apparatus 105, and a trimming apparatus 106. The post-processing apparatus may be a multifunctional post-processing apparatus having a plurality of post-processing functions. The present embodiment is described by the use of a plurality of post-processing apparatuses each having a single function. The printing apparatus 100 and the various post-processing apparatuses may be physically unconnected with one another in many cases. In such cases, a component output by the printing apparatus 100 may be temporarily buffered by, for example, a dolly, a tray, or a conveyor belt and then placed on a reception portion of each of the post-processing apparatuses in many cases. FIG. 1 illustrates an example in which a conveyor belt 107 is used. Depending on the process, an output of one of the post-processing apparatuses may be placed on the reception portion of another one of the post-processing apparatuses. Of course, the client PCs 101, the printing apparatus 100, and the various post-processing apparatuses may be all connected to one another via a network in a near-line manner so as to be able to exchange information.

In the present embodiment, each of a document and image data, such as a main body and a foldout, are referred to as a content, and an output in which the content is subjected to printing of the printing apparatus 100 is referred to as a component. When a content of a main body is subjected to printing and is output as a component of the main body, the content of the main body corresponds to the component of the main body.

Figure 2:
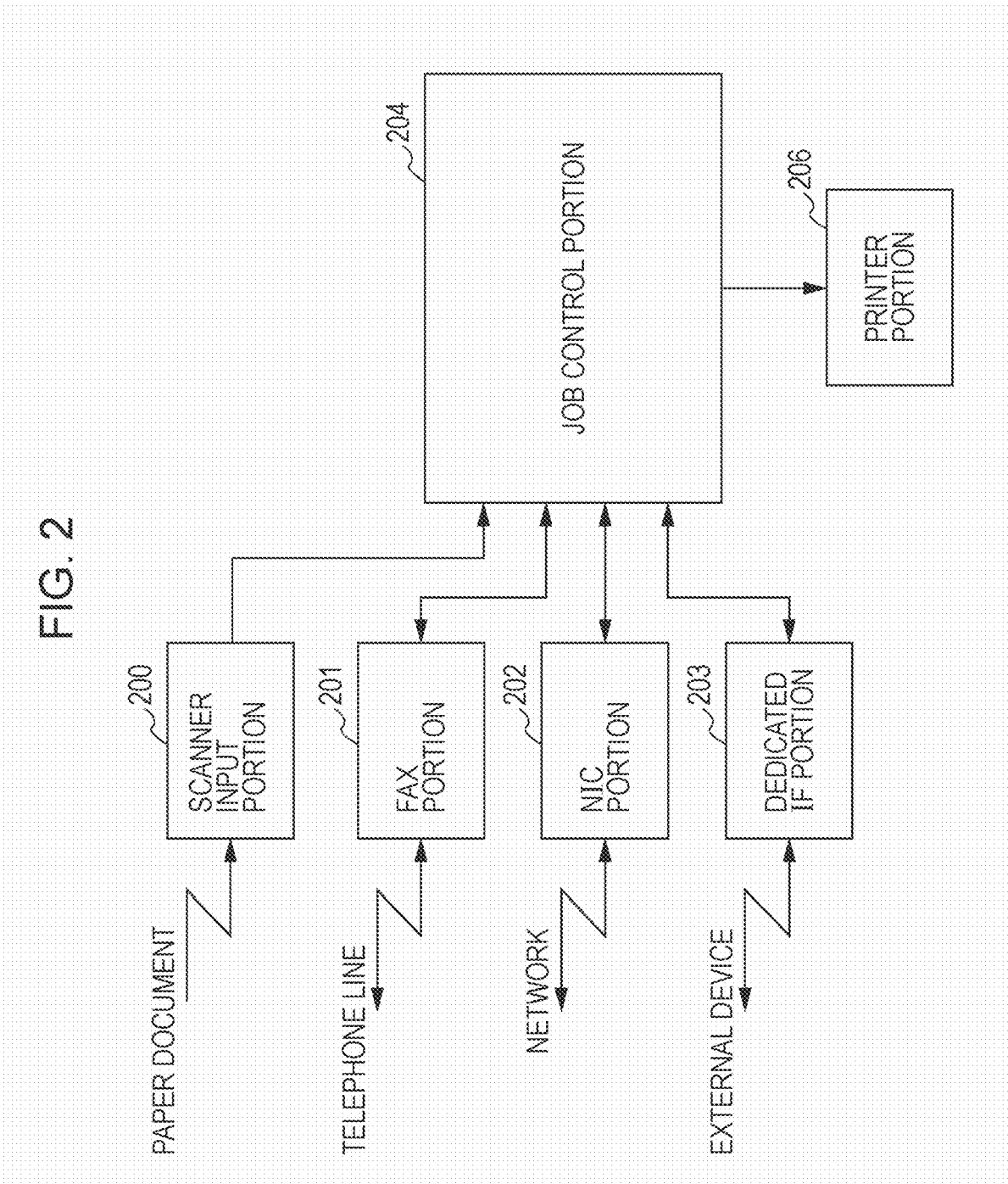
FIG. 2 is a block diagram that illustrates a configuration of a printing apparatus.

The printing apparatus 100 used in the present embodiment is described next. FIG. 2 is a block diagram of the printing apparatus 100 used in the present embodiment.

As illustrated in FIG. 2, the printing apparatus 100 includes a scanner input portion 200 scanning an image, an image processing portion 205 processing resultant image data and other image data, and a FAX portion 201 transmitting and receiving an image using a telephone line, typified by a facsimile machine. The printing apparatus 100 further includes a network interface card (NIC) portion 202 exchanging a print job or apparatus information with each of the client PCs 101 using the network 102 and a dedicated interface (IF) portion 203 exchanging information with an external device. The printing apparatus 100 further includes a job control portion 204 temporarily storing a content and determining a route depending on the usage of the printing apparatus 100 and controlling the image processing portion 205. The job control portion 204 contains a storage that can store a plurality of contents, such as a hard disk, as described above. Various contents can be controlled so as to be stored in that hard disk predominantly by the central processing unit (CPU) included in the client PC 101, which is described below. The CPU of the client PC 101 reads any one of the contents stored in that hard disk, transfers the content to a printer portion 206, and performs control allowing the printer portion 206 to be able to print the content. The CPU of the client PC 101 performs control such that, in response to an instruction from an operator, data read from the hard disk can be transferred to an external apparatus, such as the client PC 101 or another external device.

Functions of post-processing performed by the various post-processing apparatuses illustrated in FIG. 1 described above are described next. The folding apparatus 103 has the folding function of folding and inserting a sheet. The saddle stitching apparatus 104 has the saddle stitch binding function of binding the center of imposed documents. The case binding apparatus 105 has the case binding function of attaching a cover to the documents. The trimming apparatus 106 has the trimming function of cutting the edges of the bound documents to adjust pages to increase the degree of perfection of bookbinding.

As described above, a multifunctional post-processing apparatus may be used. However, such a multifunctional post-processing apparatus is typically large, and parallel operations are difficult. Therefore, a combination of post-processing apparatuses each having an independent function may be used in most cases.

In the present embodiment, there are two kinds of post-processing performed on a component: post-processing on a component basis and post-processing performed on all components. The component basis post-processing indicates post-processing performed on a part of components. The post-processing performed on all components indicates post-processing of finally integrating all the components.

The kind of post-processing depends on whether the post-processing is performed on a part of components or on all of the components, not depend on the type of a post-processing apparatus for performing the post-processing. For example, trimming performed by the trimming apparatus 106 can be made on only a part of components and on all of the components. In the former case, trimming is component basis post-processing, whereas, in the latter case, trimming is post-processing performed on all components.

In the present embodiment, binding is one example of the post-processing performed on all components. However, any kind of post-processing can be the post-processing performed on all components as long as it is performed on all components.

In the present embodiment, a plurality of post-processing apparatuses are used, as illustrated in FIG. 1. In this case, a printing process in which contents contained in a print job are printed, a post-processing process in which output components are subjected to post-processing on a component basis performed by corresponding post-processing apparatuses, and a binding process in which the components are integrated are separated.

Figure 3:
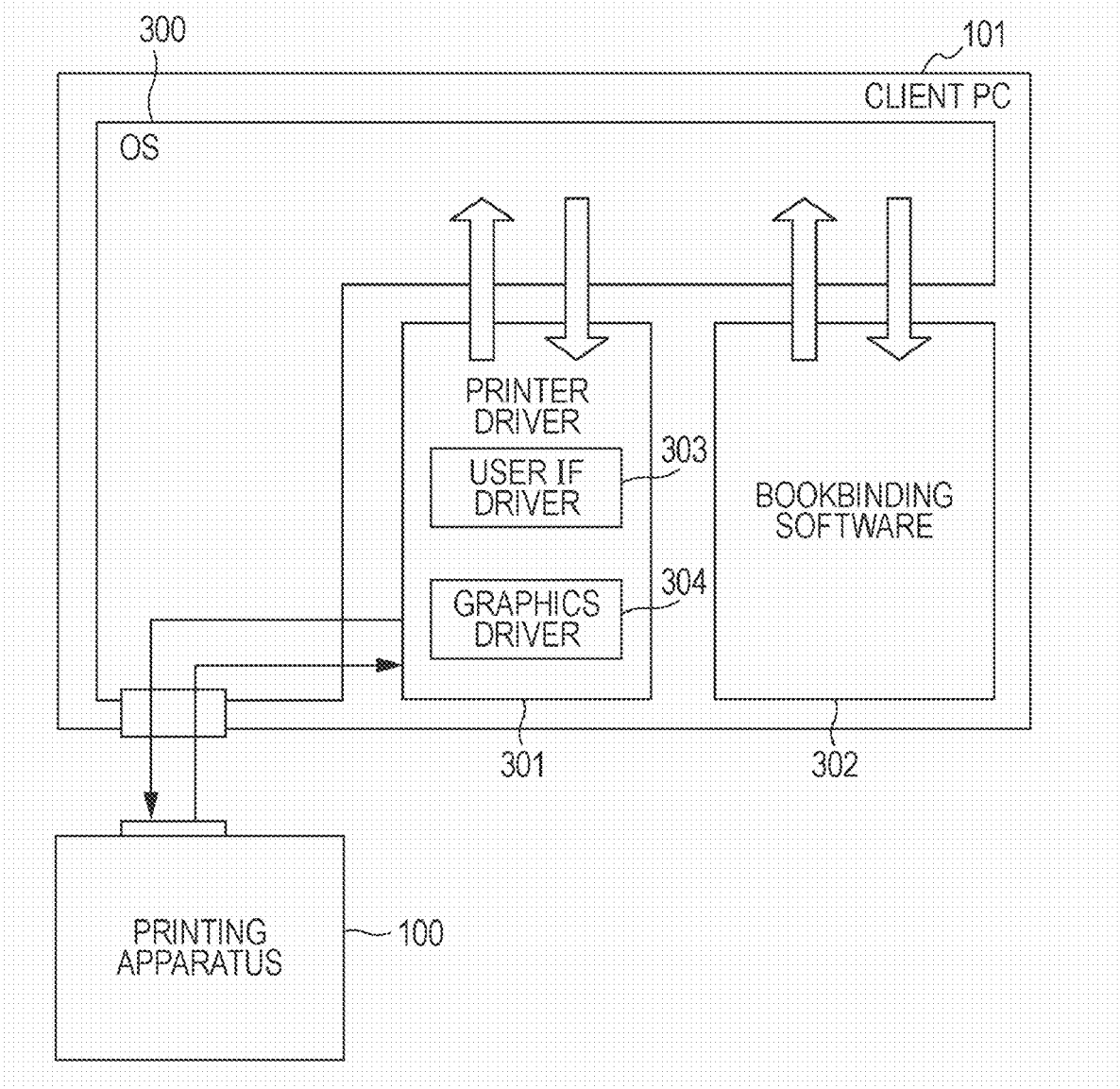
FIG. 3 is a block diagram that illustrates a software configuration of a client personal computer (PC).

The client PC 101 used in the present embodiment is described next. FIG. 3 illustrates a configuration of bookbinding software 302, a printer driver 301, and the printing apparatus 100.

The client PC 101 has an operating system (OS) 300 installed therein. The bookbinding software 302 controlling bookbinding and the printer driver 301 are installed on the OS 300 and are controlled by the OS 300.

The printer driver 301 manages functions achievable by the printing apparatus 100 and post-processing apparatuses and has the function of providing information in response to an inquiry from the bookbinding software 302.

The printer driver 301 includes a user IF driver and a graphics driver 304. The user IF driver 303 displays a user IF and saves settings. The graphics driver converts an instruction for printing and drawing provided from the bookbinding software 302 through the OS into code interpretable by the printing apparatus 100. In the present embodiment, printer settings are not made by the user IF prepared in the printer driver 301, but a function of the printing apparatus 100 obtained from the printer driver 301 is selectable on the bookbinding software 302.

Figure 4:
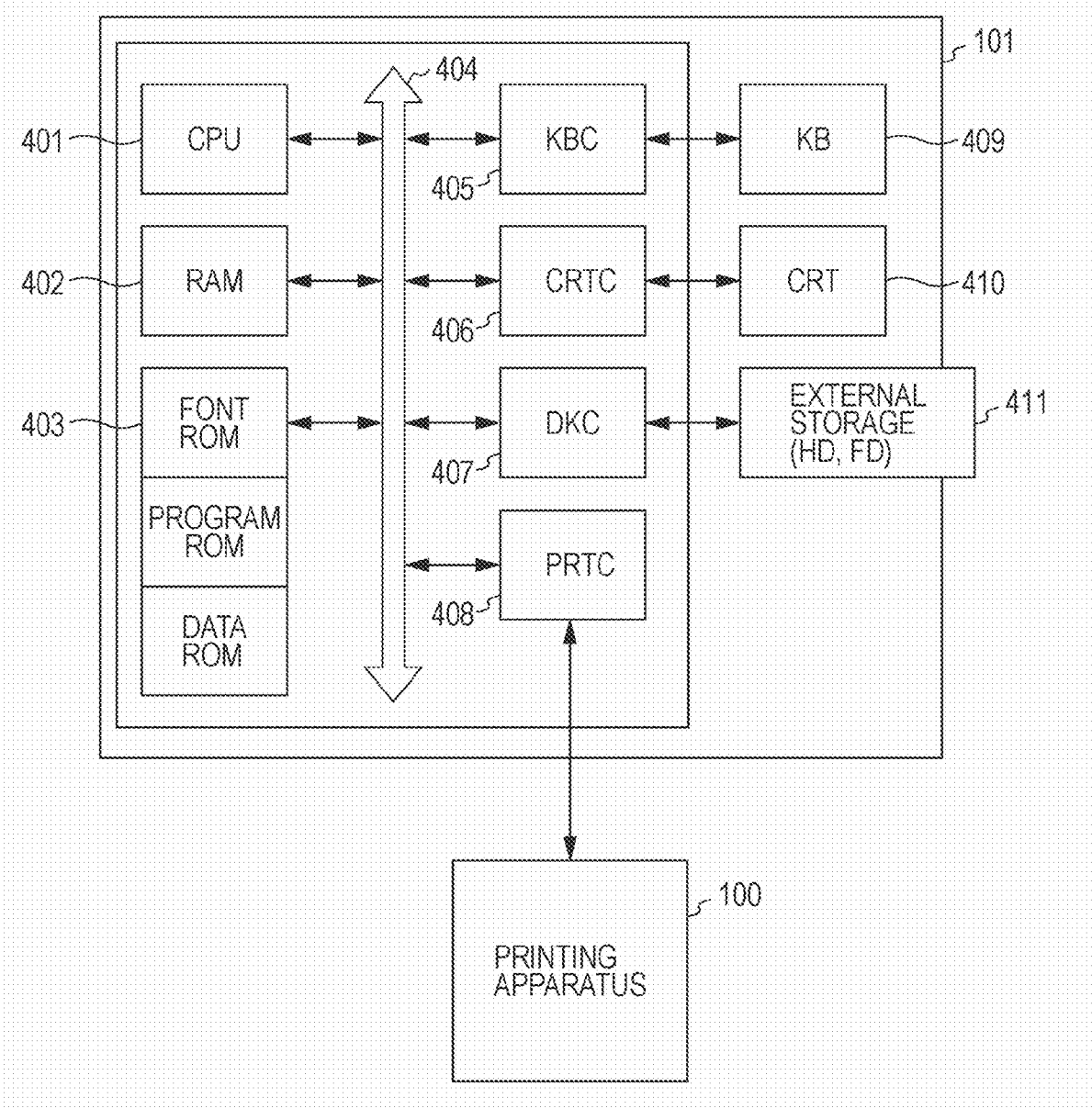
FIG. 4 is a block diagram that illustrates a hardware configuration of a client PC.

FIG. 4 illustrates a hardware configuration of the client PC 101. The client PC 101 includes a CPU 401 that performs document processing for a document that contains a figure, an image, a character, and a table (including a spreadsheet) in accordance with, for example, a document processing program stored in a program read-only memory (ROM) of a ROM 403 or an external storage 411. The CPU 401 collectively controls elements connected to a system bus 404. The program ROM of the ROM 403 or the external storage 411 stores the above-described OS 300 and bookbinding software 302. A font ROM of the ROM 403 or the external storage 411 stores font data for use in the above-described document processing. A data ROM of the ROM 403 or the external storage 411 stores various kinds of data for use in the above-described document processing. A random-access memory (RAM) 402 functions as a main memory of the CPU 401 and a work area. A keyboard controller (KBC) 405 controls a key input from a keyboard (KB) 409 or a pointing device (not shown). A cathode-ray tube controller (CRTC) 406 controls displaying on a CRT display (CRT) 410. A disk controller (DKC) 407 controls access to the external storage 411 storing a boot program, various applications, font data, a user file, an editing file, and the printer driver 301. The external storage 411 can be a hard disk or a floppy disk. A printer controller (PRTC) 408 is connected to the printing apparatus 100 via a predetermined bidirectional interface (interface) and executes communications control to the printing apparatus 100. The CPU 401 can rasterize an outline font to a display information RAM set on the RAM 402 and enable WYSIWYG on the CRT 410. The CPU 401 opens various registered windows in response to a command instructed by a mouse cursor (not shown) on the CRT 411 and executes various kinds of data processing. The user can open a window relating to settings of printing when selecting the execution of the printing to specify the settings for the printing apparatus 100 and the settings for a printing method to the printer driver 301, the settings including specification of printing mode. The CPU 401 makes the settings for the printing apparatus 100 and the printing method in accordance with the specification made by the user.

The bookbinding software 302 used in the present embodiment is described next. The bookbinding software 302 can manage contents, including a cover, a main body, a foldout, and a divider, and can control how components corresponding to the contents are combined into a desired shape to complete bookbinding. More specifically, the bookbinding software 302 collects contents necessary for bookbinding, determines the process to be performed on each of the contents, and makes the settings for the entire bookbinding.

The bookbinding software 302 can have the function of editing a document or an image of a content. However, because many kinds of document/image editing software suited for each operation are available, it is useful that a component generated using document/image editing software can be captured in the bookbinding software 302.

One approach to achieving this is a method for enabling a file format edited using document/image editing software and stored to be interpreted. However, because the file format is typically a format unique to the document/image editing software and the number of kinds of the document/image editing software is very large, it is difficult to enable file formats to be interpreted.

There is also a case where the printer driver 301 or the printing apparatus 100 performs finishing of contents, such as layout. To support this case, the bookbinding software 302 achieving the present invention captures data to be transmitted to the printing apparatus 100 in printing contents in the form of a file. Its specific steps are described below.

In generating a component using document/image editing software, the printing apparatus 100 used in the present embodiment is set as "printer to be used." Here, as an output destination, a port connected to the printing apparatus 100 is not set, but an output to a file is set. If needed, layout in bookbinding, single/duplex printing, and other settings prepared in the printer driver 301 are specified, and printing is performed. When the printing is performed, because a file is set as the output destination, a UI for allowing the user to set a file name is displayed. Thus, the user can form the file with any desired file name. The file data contains a document and image data of contents and also contains the settings made by the printer driver 301 and information on the number of pages. The file data can be easily interpreted by the bookbinding software 302.

Figure 5:
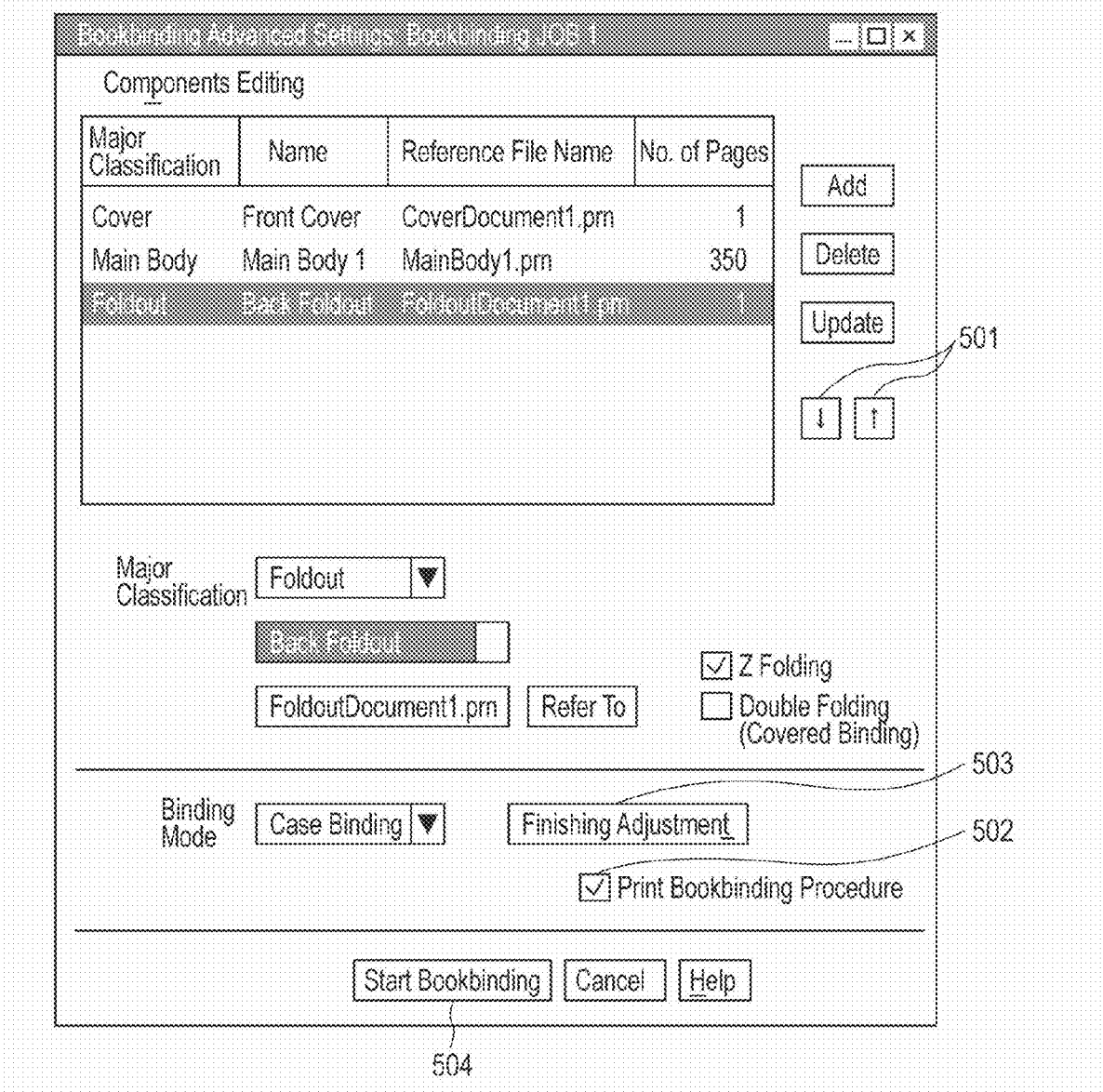
FIG. 5 illustrates an example of a basic user interface (UI) of bookbinding software.
Figure 6:
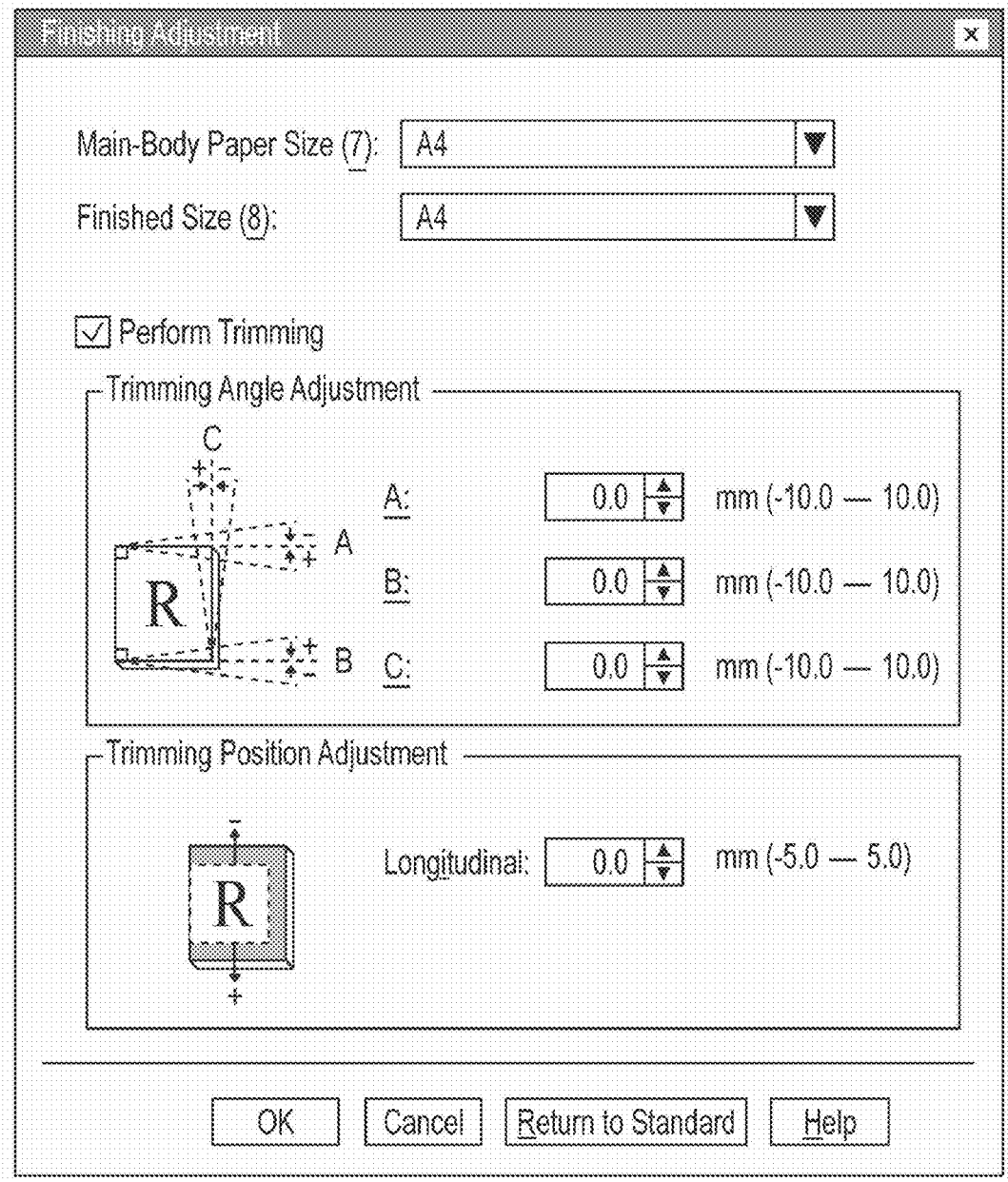
FIG. 6 illustrates an example of a UI for advanced settings in binding mode.

FIGS. 5 and 6 schematically illustrate example screens of the bookbinding software 302 running on the client PC 101.

FIG. 5 illustrates an example of a UI used for registering contents contained in a print job. In that UI, it is possible to specify a representative classification, such as a cover, a main body, a foldout, and an insert, set a name, and select a file for a content. In the example illustrated in FIG. 5, the cover, main body, and foldout are registered as contents. Because the sequence of registration of contents is the sequence of composition of the contents in bookbinding, the function of changing the sequence of composition of the contents using up and down keys 501 exists. Printing a bookbinding procedure is selectable by marking a checkbox 502. If the mark in the checkbox 502 is detected, the bookbinding procedure that describes process information up to the binding, including the printing sequence, is printed. By following the process information described in the bookbinding procedure, the task can be easily performed according to procedural steps planned in the bookbinding software 302.

In addition to specifying a representative classification, setting a name, and selecting a file for a component, as described above, finishing mode in which stapling, punching, and saddle stitching of laying out images on left and right pages and stapling the center can be specified is selectable.

When the representative classification of a content is a foldout, in addition to the items described above, Z folding and double folding (covered binding) are selectable as folding mode.

In FIG. 5, "case binding" is set as the binding mode. Other examples of the binding mode, such as "perfect binding" and "pad bookbinding," are selectable depending on a prepared post-processing apparatus. Information on the prepared post-processing apparatus is manually input by the operator, and the CPU 401 of the client PC 101 makes the settings on the basis of the input. When the client PC 101 and the post-processing apparatuses are connected over the network 102, the information is obtainable over the network.

When the pressing of a finishing adjustment key 503 illustrated in FIG. 5 is detected, finishing is adjustable in the UI illustrated in FIG. 6. For example, the finished size after binding and the trimming angle and the trimming position used when trimming is performed as the finishing, can be adjusted.

In the present embodiment, the folding apparatus 103, the case binding apparatus 105, and the trimming apparatus 106 are prepared as the post-processing apparatuses.

When the pressing of a bookbinding start key 504 is detected, a binding process begins.

The time required for completing a task up to perfection of bookbinding when printing is performed in the sequence of composition of the contents without consideration of the printing sequence of contents contained in a print job and that with a changed printing sequence are described with reference to FIGS. 7 and 8.

Figure 7A:
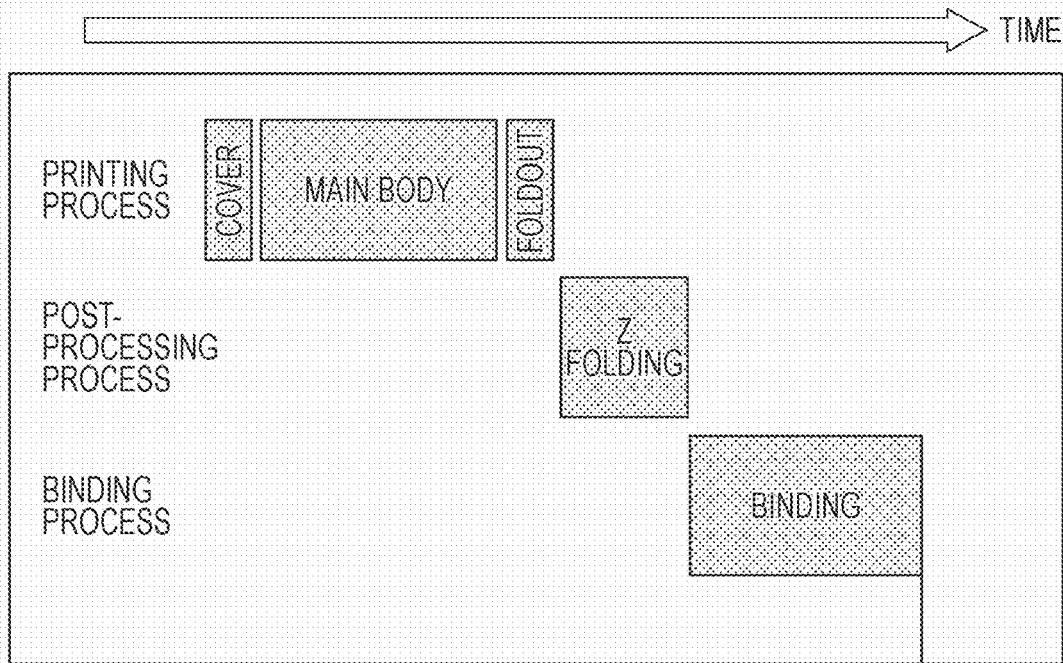
FIGS. 7A and 7B illustrate an example of a reduction in the time required for completing a task achieved by changing a printing sequence.
Figure 7B:
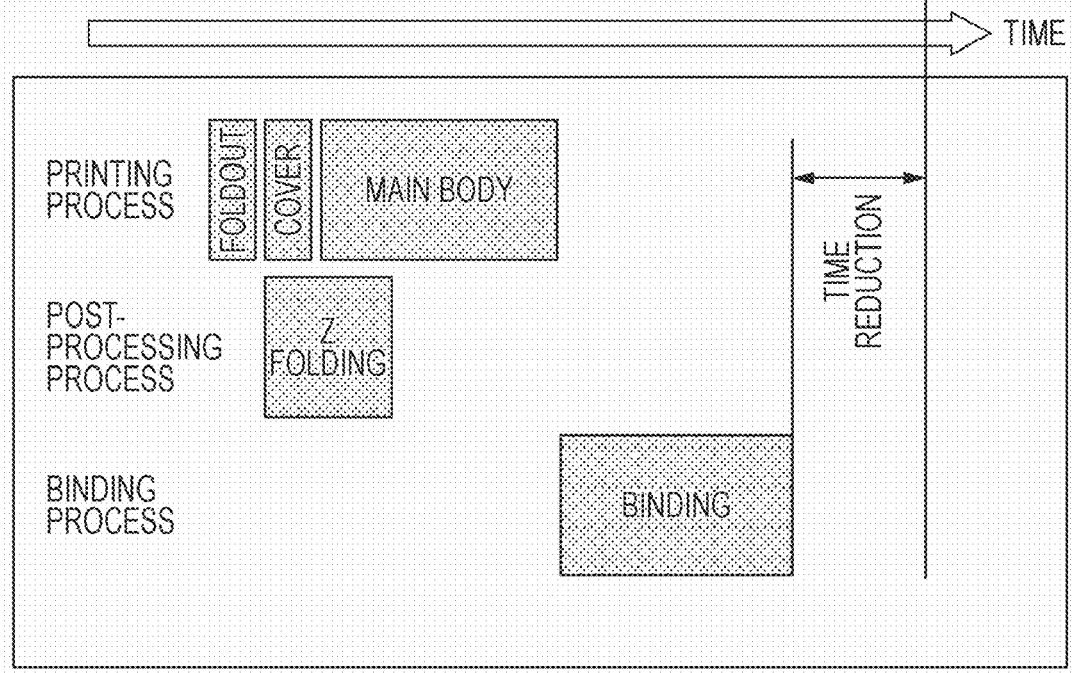

First, as illustrated in FIG. 7A, when printing is performed in the sequence of composition of the contents, the cover, the main body, and the foldout are printed in this order. In this case, after the completion of the printing on all of the contents by the printing apparatus 100, the foldout is then processed by the folding apparatus 103. After the completion of the folding by the folding apparatus 103, all components are subjected to case binding by the case binding apparatus 105, and the entire bookbinding processing is completed. The time required to this completion is the same as the total of all processing times when the time required for moving the components and the time required for making the settings for the post-processing apparatuses are not taken into account.

Here, a case is discussed where the printing sequence is determined such that a foldout in which component basis post-processing is set is printed before a cover and a main body in which component basis post-processing is not set are printed. In this case, after the completion of printing the foldout, the foldout can be processed by the folding apparatus 103 in parallel with printing of the cover or the main body. As a result, the time required for completing a task up to perfection of bookbinding can be reduced by the amount of performing printing and processing by the folding apparatus 103 in parallel with each other. The difference in the time required for completion a task is indicated in the portion of time reduction illustrated in FIG. 7B.

Figure 8A:
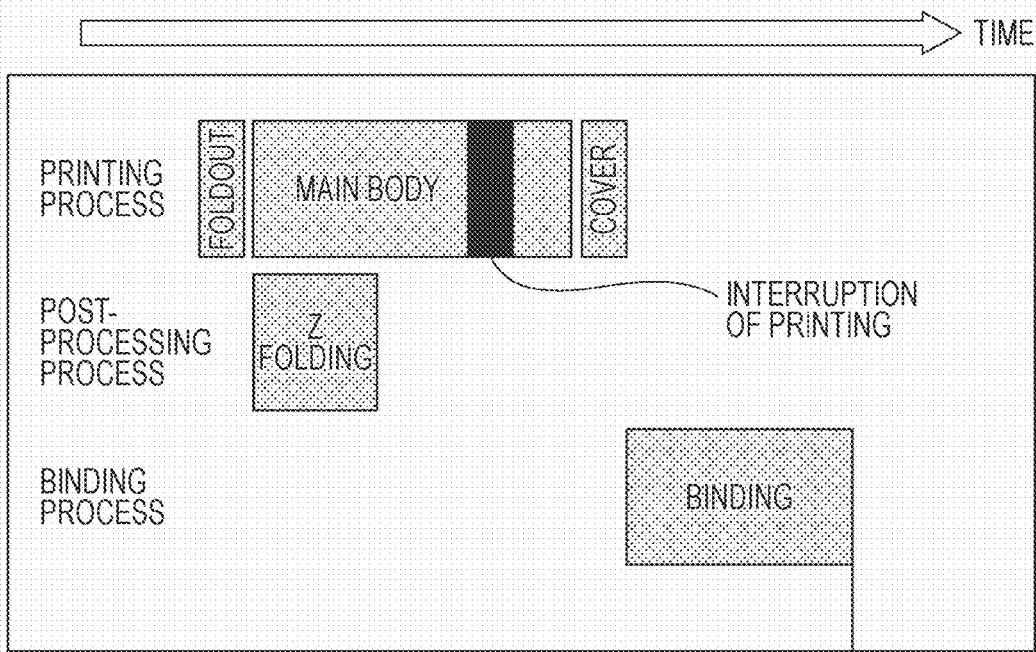
FIGS. 8A and 8B illustrate an example of a reduction in the time required for completing a task in the same processes.
Figure 8B:
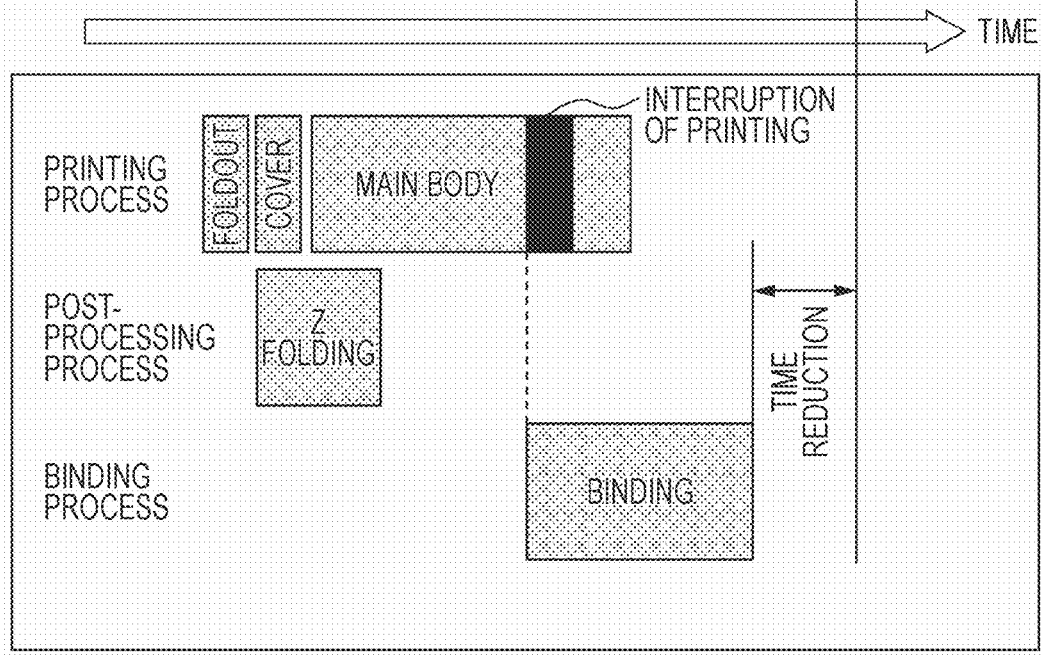

In addition, as illustrated in FIG. 8B, another case is discussed where a cover and a main body are not subjected to component basis post-processing and the main body whose processing time is longer is printed last. In printing a content having many pages, there is a high probability that the printing is interrupted by various conditions, such as the printing apparatus 100 running out of paper or the paper ejecting portion becoming full of output components. When the printing is interrupted, if there is a component that is not yet printed at all, because binding cannot begin, the time of interruption is useless. For example, as illustrated in FIG. 8A, when printing of a main-body content is interrupted, because a cover content is not printed, the binding process cannot begin.

However, as illustrated in FIG. 8B, in printing a main-body content having many pages and long processing time last, a cover content is already printed and output as a component. Thus, at the time of interruption in printing, if the main body is printed at least partly, binding in a binding process can begin. If the printing sequence is determined in such a way, the time required for completing a task can be reduced, as indicated as time reduction illustrated in FIG. 8B.

In particular, the advantages of the time reduction in the time required for completing a task are large when a print job contains a plurality of main-body contents or the number of pages or the number of copies of a main-body content is large.

Also, when a print job contains a plurality of contents corresponding to components to be subjected to the same component basis post-processing, if, among contents to be subjected to component basis post-processing, a content having long processing time is printed last, similar advantages are obtainable.

Figure 9:
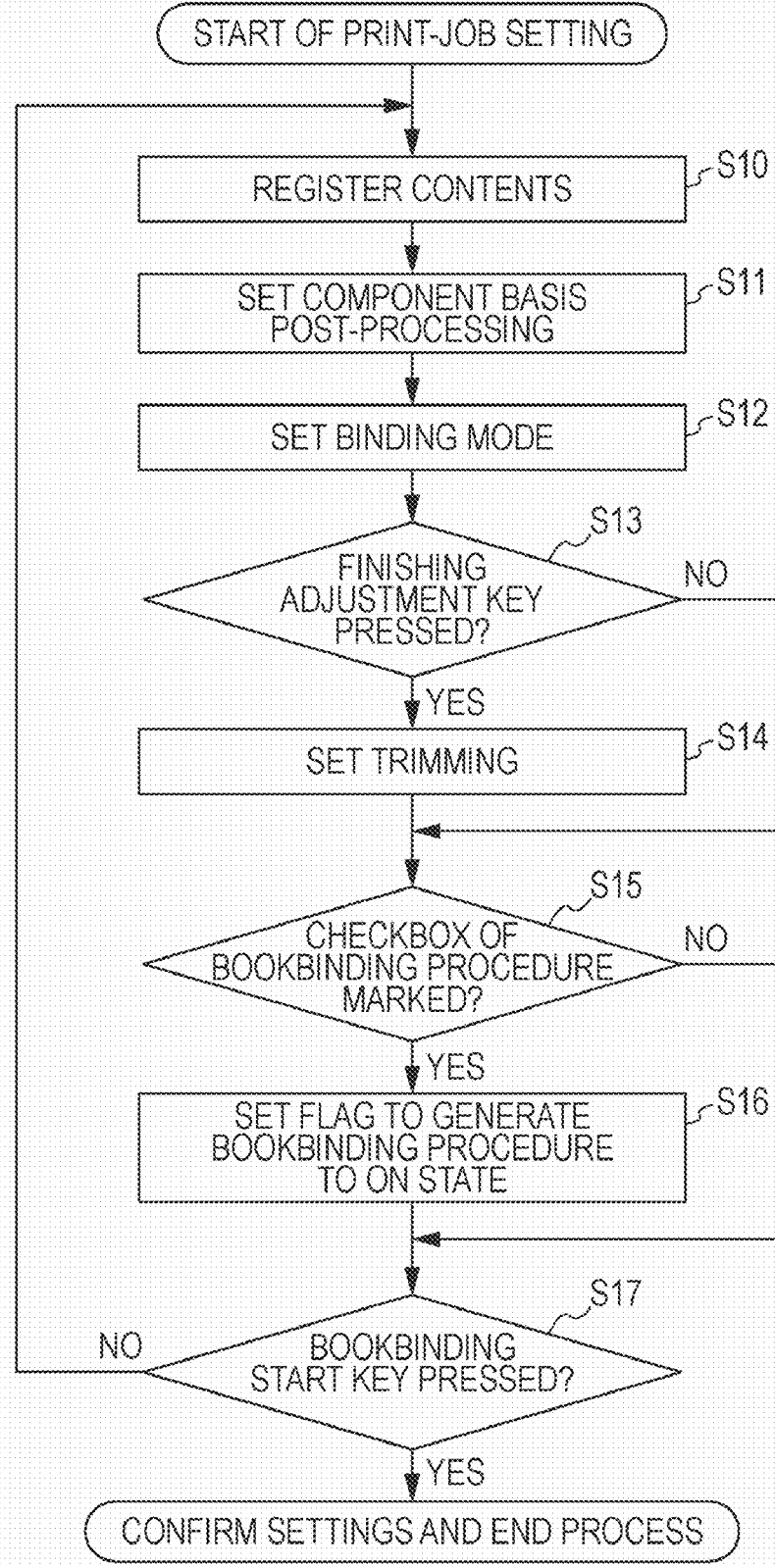
FIG. 9 is a flowchart for specifying settings of a print job in bookbinding software.

Procedural steps for setting a print job performed by the bookbinding software 302 on the client PC 101 described above are described next with reference to the flowchart illustrated in FIG. 9 using a specific example. Each step in the flowchart illustrated in FIG. 9 is carried out predominantly by the CPU 401 of the client PC 101 controlling each element of the client PC 101. The specific example is a case where a print job containing contents of a cover, a main body, and a foldout is set using the UIs illustrated in FIGS. 5 and 6.

First, in step S10, the contents contained in the print job in bookbinding are registered using the UI illustrated in FIG. 5 in response to an input from the user.

In registering a content, one of prepared major classifications of cover/main-body/foldout/divider is set in response to selection of the user. In addition, a name and a file to be used are also set in response to an input from the user. At this time, when a main body is set as the major classification of a registered content, component basis post-processing, such as punching, saddle stitching, and stapling, is set in response to selection of the user if needed. When the major classification of the registered content is a foldout, folding mode is set as component basis post-processing in response to selection of the user.

In the illustrated specific example, as shown in FIG. 5, one-page data named "front cover" is registered as the cover content, 350-page data named "main body 1" is registered as the main-body content, and one-page data named "back foldout" is registered as the foldout content and Z folding is set as folding mode.

The position of each of the registered contents can be changed by the user operating the up and down keys 501. In step S11, the order in which the contents are arranged on the UI when the position is changed is set as the sequence of composition. In the illustrated specific example, the sequence of composition is the cover, the main body, and the foldout.

When the registration of contents and setting of the sequence of composition are completed, in step S12, binding mode is set in response to selection of the user. Here, when the binding mode is not selected by the user, default mode stored in the bookbinding software 302 in advance is set as the binding mode.

In the illustrated specific example, case binding is set as the binding mode. Depending on a prepared post-processing apparatus, another binding, such as "perfect binding" and "pad bookbinding," can be set.

In step S13, it is determined whether the finishing adjustment key 503 is pressed. When the pressing of the finishing adjustment key 503 is detected (YES in step S13), the UI illustrated in FIG. 6 is launched, and flow proceeds to step S14.

In step S14, in response to selection of the user on the UI illustrated in FIG. 6, the settings of the finished size after bookbinding, of whether trimming is to be performed, and of the adjustment in the trimming angle and in the trimming position if trimming is to be performed are specified. In the illustrated specific example, the finished size is A4, and a default value of 0 mm is selected as the advance settings of trimming. When the pressing of the finishing adjustment key 503 is not detected (NO in step S13), flow proceeds to step S15.

In step S15, it is determined whether the checkbox 502 is marked on the UI illustrated in FIG. 5. When the marking of the checkbox 502 is detected (YES in step S15), in step S16, the flag to generate a bookbinding procedure is turned on. The flag to generate a bookbinding procedure is referred to after bookbinding is started and is used to determine whether the bookbinding procedure is to be added as a content of the print job. When the checkbox 502 is not marked (NO in step S15), flow proceeds to step S17 without any particular processing. In the illustrated specific example, because the checkbox 502 is marked, as shown in FIG. 5, the flag to generate the bookbinding procedure is turned on.

In step S17, it is determined whether the bookbinding start key 504 is pressed. When the pressing of the bookbinding start key 504 is detected (YES in step S17), all of the settings is confirmed, and the print job setting is completed. When the pressing of the bookbinding start key 504 is not detected (NO in step S17), flow proceeds to step S10, and the settings are accepted.

Figure 10:
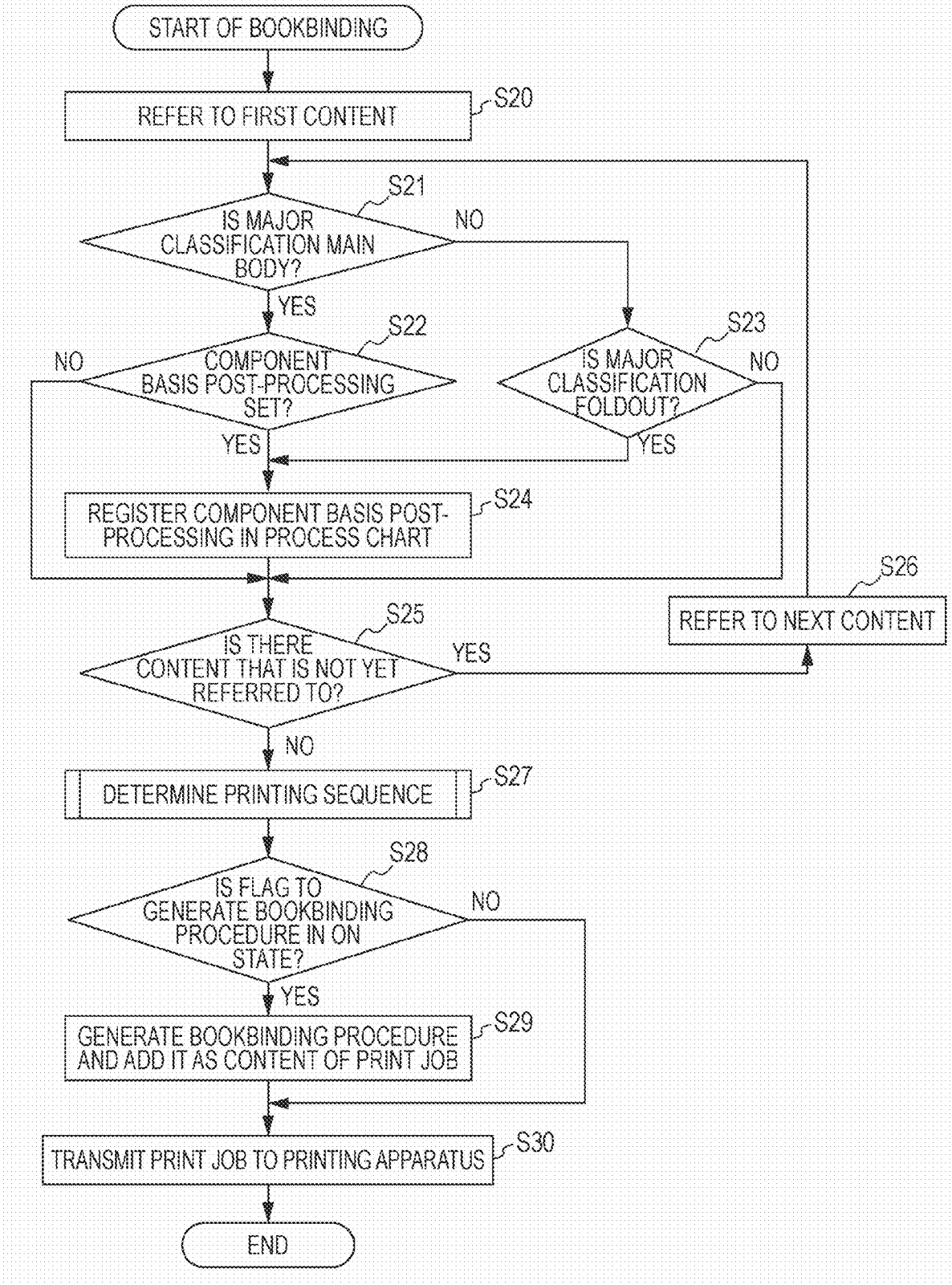
FIG. 10 is a flowchart for controlling after an instruction to start bookbinding is provided.

A process up to transmission of the print job to the printing apparatus 100 in bookbinding after the pressing of the bookbinding start key 504 is detected and the flowchart illustrated in FIG. 9 is completed is described next with reference to the flowchart illustrated in FIG. 10. Each step in the flowchart illustrated in FIG. 10 is carried out predominantly by the CPU 401 of the client PC 101 controlling each element of the client PC 101.

In step S20, among the contents contained in the print job, the first one in the sequence of composition is referred to.

In step S21, it is determined whether the major classification of the content referred to is a main body. When it is determined that the major classification of the content referred to is a main body (YES in step S21), flow proceeds to step S22. When it is not determined that the major classification of the content referred to is a main body (NO in step S21), flow proceeds to step S23.

In step S22, it is determined whether component basis post-processing is set in the determined content. When it is determined that the component basis post-processing is set (YES in step S22), flow proceeds to step S24. When it is not determined that the component basis post-processing is set (NO in step S22), flow proceeds to step S25.

In step S23, it is determined whether the major classification of the content referred to is a foldout. When it is determined that the major classification of the content referred to is a foldout (YES in step S23), flow proceeds to step S24. When it is not determined that the major classification of the content referred to is a foldout (NO in step S23), flow proceeds to step S25.

In step S24, the set component basis post-processing is registered in the process chart illustrated in FIG. 12. Here, the reason why it is not determined whether component basis post-processing is set in the content determined as a foldout is that, for a foldout, folding mode is set as component basis post-processing.

In step S25, it is determined whether there is a content that is not yet referred to. When it is determined that there is a content that is not yet referred to (YES in step S25), flow proceeds to step S26. When it is determined that there is no content that is not yet referred to (NO in step S25), flow proceeds to step S27.

In the illustrated specific example, the contents are referred to in the order of the cover, the main body, and the foldout being the sequence of composition. The component basis post-processing of only the foldout in which Z folding is set is registered in the process chart. The process chart at this time is illustrated in FIG. 12A.

In step S27, the sequence of printing the contents is determined. A method for determining the printing sequence is described later. At this time, the process sequence is determined on the basis of the component basis post-processing registered in the process chart. The process sequence indicates the sequence of processes, such as a printing process, a post-processing process, and a binding process. The determined printing sequence and process sequence are registered in the process chart. The process chart at this time is illustrated in FIG. 12B.

In step S28, it is determined whether the flag to generate the bookbinding procedure of the print job is in an ON state. When it is determined that the flag is in an ON state (YES in step S28), flow proceeds to step S29. When it is determined that the flag is not in an ON state (NO in step S28), flow proceeds to step S30.

In step S29, the content of the bookbinding procedure is generated on the basis of the process chart, and the generated content is added to the contents of the print job as the content to be printed first. An example of the bookbinding procedure is illustrated in FIG. 13. Following the printing sequence and process sequence described in this bookbinding procedure facilitates performance in accordance with the steps set by the bookbinding software 302.

In step S30, the print job is transmitted to the printing apparatus 100, and the processing is completed.

The printing apparatus 100 that receives the print job performs printing on the basis of the print job. The operator performs post-processing on a corresponding component using a corresponding post-processing apparatus with reference to the bookbinding procedure and completes bookbinding.

Figure 11:
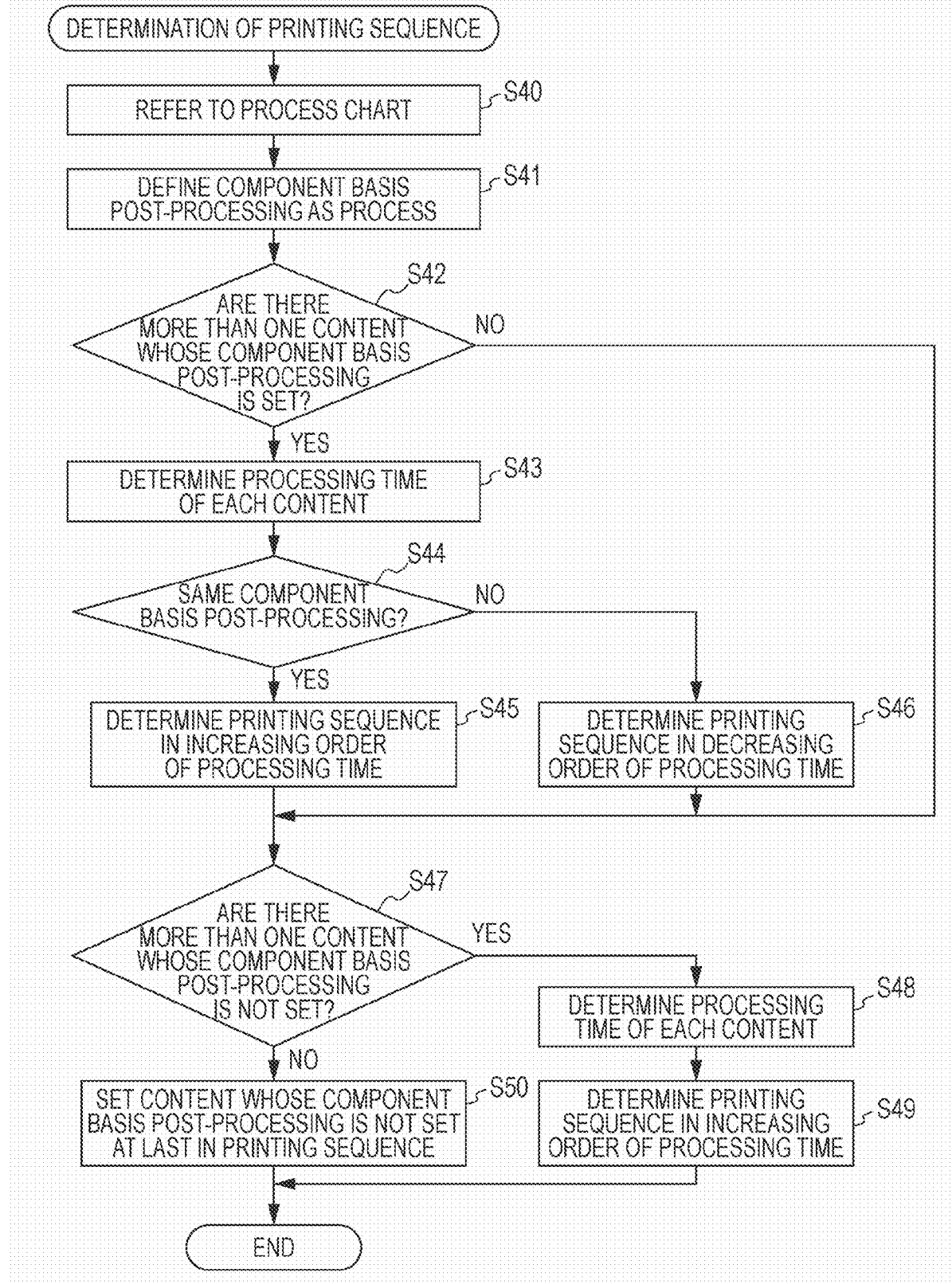
FIG. 11 is a flowchart for determining a sequence of printing contents.

A method for determining the printing sequence in step S27 is described next using the flowchart illustrated in FIG. 11. Each step in the flowchart illustrated in FIG. 11 is carried out predominantly by the CPU 401 of the client PC 101 controlling each element of the client PC 101.

In step S40, the process chart is referred to.

In step S41, component basis post-processing is defined as a single process.

In step S42, it is determined whether there is a plurality of contents in which component basis post-processing is set. When it is determined that there is a plurality of contents (YES in step S42), flow proceeds to step S43. When it is not determined that there is a plurality of contents (NO in step S42), flow proceeds to step S47.

In step S43, the processing time of each of the contents in which component basis post-processing is set is estimated. Here, the estimation of the processing time is made using the number of pages of the content. It is estimated that the larger the number of pages, the longer the processing time.

In step S44, it is determined whether the same component basis post-processing exists among the plurality of contents. Here, one example of the existence of the same component basis post-processing is that Z folding is set as the component basis post-processing in at least two contents among the contents. The nonexistence of the same post-processing indicates that there are no contents in which the same component basis post-processing is set. When it is determined that the same component basis post-processing exists in the contents (YES in step S44), flow proceeds to step S45. When it is determined that the same component basis post-processing does not exist (NO in step S44), flow proceeds to step S46.

In step S45, the printing sequence is determined in increasing order of processing time on the basis of the processing time of each content estimated in step S43. The purpose of determining the printing sequence in increasing order of processing time is described below. When the processing time of a content to be printed is long, as previously described, there is a high probability that the printing is interrupted by various conditions, such as the printing apparatus 100 running out of paper or the paper ejecting portion becoming full of output components. When the printing is interrupted, if there is a component that is not yet printed at all, because binding cannot begin, the time of interruption is useless. Accordingly, the purpose is to increase the possibility of performing a binding process even if printing is interrupted, by setting a content having the longest processing time at the end of the printing sequence.

In the present embodiment, the printing sequence of contents is set in increasing order of processing time. However, the method for determining the printing sequence is not limited to this setting as long as a content having the longest processing time is set at the end of the printing sequence. For example, the content having the longest processing time is set at the end of the printing sequence, and the printing sequence of the other contents may be the sequence of composition thereof. In such a way, setting a content having the longest processing time at the end of the printing sequence offers the advantages of increasing the possibility of performing a binding process even if printing is interrupted and of reducing the time required for completing a task.

In step S46, the printing sequence is determined in decreasing order of processing time on the basis of the processing time of each content estimated in step S43. The purpose of determining the printing sequence in decreasing order of processing time is described below. One example case is discussed where the sequence of printing a 10-page content in which Z folding is set as component basis post-processing and a 150-page content in which trimming is set as component basis post-processing is determined. Because Z folding is made by the folding apparatus 103 and trimming is made by the trimming apparatus 106, the two post-processing can be made in parallel. Thus, if the 150-page content, which has longer processing time, is printed and then the 10-page content is printed, Z folding can be performed in parallel with trimming, and this leads to a reduction in the time required for completing a task. The purpose of determining the printing sequence of contents in decreasing order of processing time in step S46 is to reduce the time required for completing a task.

In such a way, determining the printing sequence in decreasing order of processing time of a content offers the advantages of reducing the time required for completing a task brought by parallel operations of post-processing apparatuses.

In step S47, it is determined whether there is a plurality of contents in which component basis post-processing is not set. When it is determined that there is a plurality of contents in which component basis post-processing is not set (YES in step S47), flow proceeds to step S48. When it is not determined that there is a plurality of contents in which component basis post-processing is not set (NO in step S47), flow proceeds to step S50. In the subsequent steps, the order of printing the content(s) in which component basis post-processing is not set is determined. The determined order of printing follows the printing sequence of the contents in which component basis post-processing is set determined in the previous steps. Determining the printing sequence such that contents in which component basis post-processing is set are printed before contents in which component basis post-processing is not set are printed allows printing and post-processing to be performed in parallel. Accordingly, the advantages of reducing the time required for completing a task are obtainable.

In step S48, similar to step S43, the processing time of a content in which component basis post-processing is not set is estimated.

In step S49, the printing sequence is determined in increasing order of processing time on the basis of the processing time of each content estimated in step S48. The purpose of determining the printing sequence in increasing order of processing time is the same as in step S45. Also in step S49, the method for determining the printing sequence is not limited to the above method as long as a content having the longest processing time is set at the end of the printing sequence. For example, the content having the longest processing time is set at the end of the printing sequence, and the printing sequence of the other contents may be the sequence of composition thereof. In such a way, setting a content having the longest processing time at the end of the printing sequence offers the advantages of increasing the possibility of performing a binding process even if printing is interrupted and of reducing the time required for completing a task.

In step S50, the content in which component basis post-processing is not set is placed at the end of the printing sequence, and the processing is completed. Here, if there is no content in which component basis post-processing is not set, the processing is completed without any particular processing.

The printing sequence determined through the above steps is registered in the process chart in step S27 illustrated in FIG. 10 together with the process sequence. In the illustrated specific example, because component basis post-processing is set in only the foldout, the printing sequence is determined such that printing the foldout is set at the first and printing the main body, which has longer processing time than that of the cover, is set at the end. Accordingly, the printing sequence of the contents is the foldout, the cover, and the main body.

In the present embodiment, if there is no particular specification, the process sequence and the printing sequence are determined in accordance with the sequence of composition in registration. However, the sequences may be determined by another method in consideration of, for example, the arrangement of the post-processing apparatuses.

In the present embodiment, the number of pages is used in estimation of processing time. However, the processing time may be determined in consideration of print settings, such as single/duplex or color mode. In addition, for a content in which component basis post-processing is set, the processing time for the component basis post-processing may be used, in place of the processing time for printing. In this case, the processing time may be based on the number of pages or the type or settings of the component basis post-processing. For example, in step S46 illustrated in FIG. 11, because different kinds of component basis post-processing are set in the contents, it is useful that the processing time for component basis post-processing be used. This is because printing a content having shorter processing time for post-processing after printing a content having longer processing time for post-processing allows different kinds of post-processing to be performed in parallel, so the time required for completing a task can be reduced. Also in step S45, it is useful that the processing time for component basis post-processing be used. This is because, although the same post-processing cannot be performed in parallel, it is possible to reduce the time if the post-processing is interrupted.

In the present embodiment, in step S44 illustrated in FIG. 11, it is determined whether the same post-processing is set in a plurality of contents. However, without this determination, the printing sequence may be determined such that, among a plurality of contents in which component basis post-processing is set, printing a content having the longest processing time is set at the end of the sequence of printing the plurality of contents.

In the present embodiment, the content of the bookbinding procedure is printed in advance of the other contents by placing that content at the start of the print job. However, the bookbinding procedure may be printed independently.

The functions of the present invention are also achievable by a computer reading program code for carrying out the steps in the flowcharts illustrated in the above embodiment from a computer-readable storage medium and executing it. In this case, the program code itself achieves the functions of the above embodiment. Thus, this program code and a computer-readable storage medium that stores the program code can also be included in the present invention.

Examples of the computer-readable storage medium that stores the program code include computer-readable storage media, such as a floppy disk, a hard disk, an optical disk, a magneto-optical disk, a compact-disk read-only memory (CD-ROM), a CD-recordable (CD-R), magnetic tape, a non-volatile memory card, and a ROM.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-151822 filed Jun. 10, 2008, which is hereby incorporated by reference herein in its entirety.

What is claimed is:

1. A print control device for causing a printing apparatus to perform printing based on a plurality of contents used for outputting a plurality of components to be finally integrated, the print control device comprising:
a determining unit configured to determine whether component basis post-processing is set in each of the plurality of contents; and
a sequencing unit configured to determine a printing sequence of printing the plurality of contents,
wherein the sequencing unit determines the printing sequence such that at least one first type of content determined by the determining unit as a content in which the component basis post-processing is set is printed in advance of at least one second type of content determined by the determining unit as a content in which the component basis post-processing is not set, and
wherein when a plurality of the first type of contents exist, the sequencing unit is configured to differently determine the printing sequence between a first case where the same component basis post-processing is set in at least two of the plurality of first type of contents and a second case where the same component basis post-processing is not set in the plurality of first type of contents.

2. The print control device according to claim 1, wherein when a plurality of the first type of contents exist, the sequencing unit is configured to determine the printing sequence such that the first plurality of first type of contents are printed in decreasing order of processing time.

3. The print control device according to claim 2, wherein the processing time is estimated on the basis of the number of pages of each of the contents.

4. The print control device according to claim 1, wherein in the first case, where the same component basis post-processing is set in at least two of the plurality of the first type of contents, the sequencing unit is configured to determine the printing sequence such that, among the plurality of the first type of contents, a content having the longest processing time is printed at the end of the printing sequence, and in the second case, where the same component basis post-processing is not set in the plurality of the first type of contents, the sequencing unit is configured to determine the printing sequence such that the plurality of the first type of contents are printed in decreasing order of processing time.

5. The print control device according to claim 1, wherein when a plurality of the second type of contents exist, the sequencing unit is configured to determine the printing sequence such that, among the plurality of second type of contents, a content having the longest processing time is printed at the end of the printing sequence.

6. The print control device according to claim 1, wherein the print control device causes the printing apparatus to print a bookbinding procedure that describes the printing sequence determined by the sequencing unit.

7. A print control method for controlling a printing apparatus to perform printing based on a plurality of contents used for outputting a plurality of components to be finally integrated, the print control method comprising:
a determining step of determining whether component basis post-processing is set in each of the plurality of contents; and
a sequencing step of determining a printing sequence of printing the plurality of contents,
wherein in the sequencing step, the printing sequence is determined such that at least one first type of content determined in the determining step as a content in which the component basis post-processing is set is printed in advance of at least one second type of content determined in the determining step as a content in which the component basis post-processing is not set, and
wherein when a plurality of the first type of contents exist, in the sequencing step, the printing sequence is differently determined between a first case where the same component basis post-processing is set in at least two of the plurality of first type of contents and a second case where the same component basis post-processing is not set in the plurality of first type of contents.

8. The print control method according to claim 7, wherein when a plurality of the first type of contents exist, in the sequencing step, the printing sequence is determined such that the plurality of first type of contents are printed in decreasing order of processing time.

9. The print control method according to claim 8, wherein the processing time is estimated on the basis of the number of pages of each of the contents.

10. The print control method according to claim 7, wherein, in the first case, where the same component basis post-processing is set in at least two of the plurality of the first type of contents, the printing sequence is determined in the sequencing step such that, among the plurality of the first type of contents, a content having the longest processing time is printed at the end of the printing sequence and, in the second case, where the same component basis post-processing is not set in the plurality of the first type of contents, the printing sequence is determined in the sequencing step such that the plurality of the first type of contents are printed in decreasing order of processing time.

11. The print control method according to claim 7, wherein when a plurality of the second type of contents exist, the printing sequence is determined in the sequencing step such that, among the second plurality of second type of contents, a content having the longest processing time is printed at the end of the printing sequence.

12. The print control method according to claim 7, wherein the print control method causes the printing apparatus to print a bookbinding procedure that describes the printing sequence determined in the sequencing step.

13. A non-transitory computer-readable storage medium that stores a program for allowing a computer to execute steps of a method comprising:
a determining step of determining whether component basis post-processing is set in each of the plurality of contents; and
a sequencing step of determining a printing sequence of printing the plurality of contents, wherein in the sequencing step, the printing sequence is determined such that at least one first type of content determined in the determining step as a content in which the component basis post-processing is set is printed in advance of at least one second type of content determined in the determining step as a content in which the component basis post-processing is not set, and wherein when a plurality of the first type of contents exist, in the sequencing step, the printing sequence is differently determined between a first case where the same component basis post-processing is set in at least two of the plurality of first type of contents and a second case where the same component basis post-processing is not set in the plurality of first type of contents.

\* \* \* \* \*